(12) United States Patent
Hu et al.

(10) Patent No.: US 11,972,504 B2
(45) Date of Patent: Apr. 30, 2024

(54) METHOD AND SYSTEM FOR OVERLAPPING SLIDING WINDOW SEGMENTATION OF IMAGE BASED ON FPGA

(71) Applicant: ZHEJIANG LAB, Hangzhou (CN)

(72) Inventors: Tang Hu, Hangzhou (CN); Xiao Yu, Hangzhou (CN); Xiangdi Li, Hangzhou (CN); Songnan Ren, Hangzhou (CN); Li Yan, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/324,174

(22) Filed: May 26, 2023

(65) Prior Publication Data
US 2024/0054597 A1    Feb. 15, 2024

Related U.S. Application Data

(63) Continuation of application No. PCT/CN2022/124892, filed on Oct. 12, 2022.

(30) Foreign Application Priority Data

Aug. 10, 2022  (CN) .......................... 202210953652.1

(51) Int. Cl.
*G06T 1/60* (2006.01)
(52) U.S. Cl.
CPC ..................................... *G06T 1/60* (2013.01)
(58) Field of Classification Search
CPC ...................................................... G06T 1/60

(Continued)

(56) References Cited

U.S. PATENT DOCUMENTS

2002/0135586 A1* 9/2002 Sandford ................. G06T 5/20
                                                    345/543
2014/0310496 A1* 10/2014 Eguro ................ G01B 11/2513
                                                     711/168

FOREIGN PATENT DOCUMENTS

CN         104104888 A       10/2014
CN         107423734 A       12/2017
(Continued)

OTHER PUBLICATIONS

Amaricai et al., An FPGA Sliding Window-Based Architecture Harris Corner Detector, IEEE 2014 24th International Conference on Field Programmable Logic and Applications (FPL), Oct. 2014, pp. 1-4.*

(Continued)

*Primary Examiner* — Jacinta M Crawford
(74) *Attorney, Agent, or Firm* — W&G Law Group

(57) ABSTRACT

Disclosed a method and a system for overlapping sliding window segmentation of an image based on an FPGA. According to the method, on-chip BRAMs storage resource cost of FPGA is determined; each on-chip BRAM in FPGA is used to cache the pixel data of each segmented sub-image in parallel; when the pixel data received by the BRAMs reaches a preset threshold or the last pixel of the segmented sub-image is written into the on-chip BRAMs, the data is written from the on-chip BRAMs to an off-chip DDR memory in a burst continuous writing mode; the repeated data generated by segmentation of horizontally overlapping sliding windows are written into the on-chip BRAMs corresponding to the current segmented sub-image and adjacent segmented sub-images thereof respectively in a synchronous and parallel manner.

6 Claims, 5 Drawing Sheets

(58) Field of Classification Search
USPC .......................................................... 345/531
See application file for complete search history.

(56) References Cited

FOREIGN PATENT DOCUMENTS

| | | | |
|---|---|---|---|
| CN | 107861888 | A | 3/2018 |
| CN | 109919952 | A | 6/2019 |
| CN | 110781839 | A | 2/2020 |
| CN | 111028360 | A | 4/2020 |
| CN | 115035128 | A | 9/2022 |
| EP | 1566765 | A1 | 8/2005 |
| JP | 2007313845 | A | 12/2007 |

OTHER PUBLICATIONS

International Search Report (PCT/CN2022/124892); dated Jan. 12, 2023.
Notice of Allowance(CN202210953652.1); dated Sep. 30, 2022.
A-Convolutional-Neural-Network-accelerator-based-on-FPGA.
Fusion-method-based-on-FPGA-image-oVerlay-ancross-screen-stitching.
A-Flexible-and-Efficient-FPGA-Accelerator-for-Various-Large-Scale-and-Lightweight-CNNs.

* cited by examiner

METHOD AND SYSTEM FOR OVERLAPPING SLIDING WINDOW SEGMENTATION OF IMAGE BASED ON FPGA

CROSS-REFERENCE TO RELATED APPLICATIONS

The present application claims priority to Chinese Patent Application No. 202210953652.1, filed on Aug. 10, 2022, the content of which is incorporated herein by reference in its entirety.

TECHNICAL FIELD

The present application relates to the technical field of image processing, and in particular, to a method and a system for overlapping sliding window segmentation of an image based on an FPGA.

BACKGROUND OF THE INVENTION

Image segmentation is an important technology in the field of digital image processing, especially in target detection and recognition. With the rapid development of camera technology, high-definition cameras, such as industrial cameras with hundreds of millions of pixels, have been widely used. How to identify key sensitive targets in super-large images has gradually become a hot and difficult research topic. At present, it is an important mainstream technology to use a deep learning method for target detection and recognition, the process of which is to slice and segment the original input large-size image to convert the image into several segmented sub-images with a smaller size that are suitable for deep learning algorithm processing, and then send the segmented sub-images to a deep learning algorithm for inference and recognition. In order to reduce the probability that the sensitive target to be identified is just between adjacent segmented sub-images, which would lead to missed detection, an overlapping sliding window segmentation method is widely used.

However, large-scale image segmentation involves discontinuous addressing, especially the repeated data generated by overlapping sliding window segmentation, which leads to frequent inefficient data access between on-chip memories and off-chip memories, such as DDR memory devices, which leads to obvious reduction in segmentation efficiency and has become an important bottleneck affecting the real-time performance of detection and recognition of the entire target, and therefore needs to be improved by new technical solutions. At present, there are two main methods for large-size image segmentation, one is CPU-based software program execution, and the other is Field Programmable Gate Array (FPGA)-based hardware parallel processing.

An application with a filing number of CN201911037783.X mentions the sliding window specification, sliding window step size setting, sliding window segmentation process, etc., and lays more emphasis on the overall process of small-size target recognition technology based on a sliding window method, but does not provide methods or descriptions for the detailed processing of pixel data of each segmented sub-image in the sliding window segmentation process of large-size images.

An application with a filing number of CN201510253984.9 mentions a method of image data segmentation and display based on an FPGA. An internal FPGA memory is used to segment the image and send the sub-images to an external DSP for processing and splicing display, and the ultimate goal is suitable for the display of a whole large-size image. However, this application does not provide a solution for the problem of how to segment sliding windows based on an FPGA, especially sliding windows with overlapping areas.

SUMMARY OF THE INVENTION

In order to improve the real-time performance of target detection and recognition of large-size images and solve the bottleneck problem of serious time consumption in the segmentation process of large-size images, the present application provides a method for overlapping sliding window segmentation of an image based on an FPGA. According to the method, each sub-image in the sliding window segmentation process is cached by an on-chip block random access memory (BRAM) of the Field Programmable Gate Array (FPGA); for the repeated data generated in the process of segmenting sub-images in horizontal overlapping sliding windows, sub-images are written into on-chip BRAMs corresponding to the current segmented sub-image and its adjacent segmented sub-images respectively in a synchronous and parallel manner; for the overlapping pixels of k−s rows and K columns generated in the process of segmenting sub-images in vertical overlapping sliding windows, the starting address is rollback offset by a storage space of (k−s)*k overlapping pixels; burst continuous writing is used between the on-chip BRAMs and off-chip DDR memory.

The objective of the present application is achieved through the following technical solution.

A method for overlapping sliding window segmentation of an image based on an FPGA is provided. According to the method, an original input image is m rows×n columns, and a size of a segmented sub-image is k rows×k columns; a step size of sliding windows is s, and s<k, and a sequence of the sliding windows is horizontal from left to right first, and then vertical from top to bottom; if a boundary is not divisible, expansion is implemented by filling all-zero pixels outwards; the FPGA needs ⌈n/s⌉ BRAMs in total, which are numbered as 0, 1, 2, . . . , ⌈n/s⌉−1, where ⌈ ⌉ means rounding up.

The method includes the following steps:

S1: starting from a first row of the original image, writing pixel data from (1,1) to (1,s) into BRAM_0 in sequence, BRAM_0 corresponding to a $(0,0)^{th}$ segmented sub-image, (1,s+1) to (1,k) are overlapping areas of the $(0,0)^{th}$ segmented sub-image and a $(0,1)^{th}$ segmented sub-image in a horizontal sliding window process in the first row; writing data in the overlapping areas into BRAM_0 and BRAM_1 in synchronous and parallel manner, BRAM_1 corresponding to the $(0,1)^{th}$ segmented sub-image;

S2: executing a horizontal overlapping sliding window, and writing pixel data of (1,k+1) to (1,2s) in the first row into BRAM_1; during the horizontal overlapping sliding window, starting a burst continuous write operation of each on-chip BRAM to an off-chip DDR memory when data received by each BRAM reaches a preset threshold or a last pixel of each segmented sub-image is written into the corresponding BRAMs;

S3: (1, 2s+1) to (1,s+k) pixels being overlaps of the $(0,1)^{th}$ segmented sub-image and a $(0,2)^{th}$ segmented sub-images in the horizontal sliding window process of the first row, and writing overlapped data synchronously into BRAM_1 and BRAM_2, BRAM_2 corresponding to a $(0,2)^{th}$ segmented sub-image;

S4: executing subsequent operations in a similar manner, until the horizontal overlapping sliding window segmentation of all pixels in the first row is completed;

S5: referring to the first row, sequentially executing horizontal overlapping sliding windows from a second row to a $k^{th}$ row until a first complete horizontal overlapping sliding window is executed and written into the off-chip DDR memory;

S6: executing vertical overlapping sliding window processing, the last (k−s) rows and k columns of pixel data of respective segmented sub-images (0,0), (0,1), . . . , (0, ⌈n/s⌉−1) being used as starting (k−s) rows and k columns of pixel data in a next batch of segmented sub-images (1,0), (1,1), . . . , (1, ⌈n/s⌉−1), and are spliced with each row of pixel data written subsequently;

S7: executing the horizontal overlapping sliding window processing from a k+1$^{th}$ row to a s+k$^{th}$ row of the original image according to steps S1-S5, so a second batch of segmented sub-images (1,0), (1,1), . . . , (1, ⌈n/s⌉−1) has been written to the corresponding BRAM_0, BRAM_1, . . . , BRAM_⌈n/s⌉ respectively, and executing the burst continuous write operation from the on-chip BRAMs to the off-chip DDR memory; and S8: executing subsequent operations in a similar manner, repeating a cross processing of a horizontal overlapping sliding window and a vertical overlapping sliding window until the overlapping sliding window of the entire original input image is segmented and written into external DDR memory respectively.

Further, in the process of vertical overlapping sliding window segmentation in step S6, the next batch of segmented sub-images and a previous batch of segmented sub-images are respectively stored in a same corresponding BRAM, and (k−s)*k pixel data in the overlapping area formed by the vertical sliding window are spliced with subsequent pixel data in the external DDR memory by starting address rollback offset, thereby realizing data reuse in a vertical overlapping area.

Further, the preset threshold in step S2 is equal to a maximum capacity of burst continuous writing, so that the highest access efficiency to the external DDR is achieved.

Further, internal pixel data of each segmented sub-image written in the external DDR memory in step S8 are continuously addressed in row-major order, and respective segmented sub-images are sorted in column-major order with continuous addresses, that is, the sub-images are stored in an order of (0,0), (1,0), (2,0), . . . , (⌈m/s⌉−1,0), (0,1), (1,1), . . . , (⌈m/s⌉−1, ⌈n/s⌉−1).

A system for overlapping sliding window segmentation of an image based on an FPGA is further, provided. The system includes one or more processors for implementing the above method for overlapping sliding window segmentation of an image based on an FPGA.

A computer-readable storage medium is further provided. A program is stored on the computer-readable storage medium, and when executed by a processor, the program implements the above method for overlapping sliding window segmentation of an image based on an FPGA.

The present application has the following beneficial effects.

According to the present application, all sub-images generated by sliding window segmentation of a large-size image are cached by an on-chip BRAM of an FPGA, and are written into an off-chip DDR memory in a burst continuous writing mode, thereby avoiding frequent and inefficient read-write access to the off-chip DDR memory in the image segmentation process; the repeated data generated by horizontally overlapping sliding windows are written in a parallel and synchronous manner to the on-chip BRAMs corresponding to the current sub-image and its adjacent sub-images, while for the repeated data generated by vertically overlapping sliding windows, the starting address of the off-chip DDR memory is subjected to rollback offset and the data are spliced with subsequent pixel data, thus realizing data reuse and saving storage space occupation; the segmented sub-images are continuously addressed in the off-chip DDR memory, which is beneficial to the efficient call of subsequent deep learning algorithms. The present application can significantly improve the execution efficiency of segmentation of large-size images, especially segmentation of overlapping sliding windows, and further significantly improve the overall real-time performance of target detection and recognition of large-size images.

DETAILED DESCRIPTION OF THE INVENTION

Figure 1:
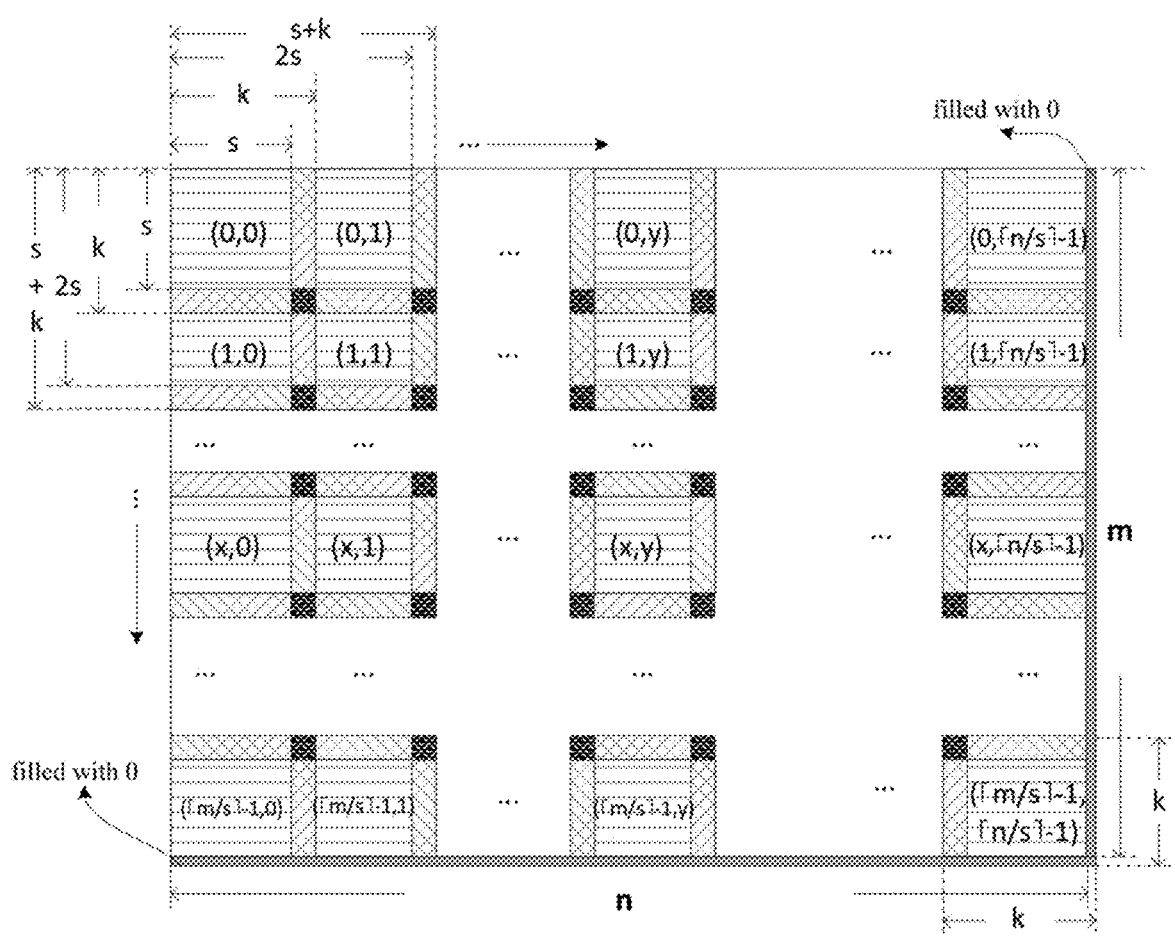
FIG. 1 is a schematic diagram of segmentation of overlapping sliding windows of a large-size image of m rows×n columns.

Exemplary embodiments will be described in detail, and examples thereof are illustrated in the drawings. When the following description refers to the drawings, unless otherwise indicated, the same numbers in different drawings indicate the same or similar elements. The embodiments described in the following exemplary embodiments do not represent all embodiments consistent with this application. Rather, they are merely examples of devices and methods consistent with some aspects of the present application as detailed in the appended claims.

The terms used in this application are for the purpose of describing specific embodiments only and are not intended to limit this application. The singular forms "a", "said" and "the" used in this application and the appended claims are also intended to include the plural forms, unless the context clearly indicates other meaning. It should also be understood that the term "and/or" as used herein refers to and includes any or all possible combinations of one or more associated listed items.

It should be understood that although the terms "first", "second", "third", etc. may be used in this application to describe various types of information, such information should not be limited to these terms. These terms are only used to distinguish the same type of information from each other. For example, without departing from the scope of this application, the first piece of information can also be called the second piece of information, and similarly, the second piece of information can also be called the first piece of information. Depending on the context, the word "if" as used herein can be interpreted as "in case of" or "when" or "in response to a determination".

First, the technical terms are explained as below:
(1) FPGA: Field Programmable Gate Array.
(2) BRAM: Block RAM, internal block RAM of an FPGA.
(3) AXI: Advanced Extensible Interface, an AXI bus interface.
(4) DDR: Double Data Rate, which specifically refers to a DDR Synchronous Dynamic Random Access Memory, such as DDR3 (or DDR4) SDRAM.

In a specific embodiment of the present application, an original large-size image with hundreds of millions of pixels is taken as an example, the size of which is 11,664 rows× 8,750 columns, and the size of the segmented sub-image is 1024 rows×1024 columns, which is commonly used in deep learning algorithms; the step sizes of the horizontal and vertical sliding windows are all 808, and the overlapping area is 216 pixels, with an overlapping rate of more than 20%; the whole overlapping sliding window segmentation process will produce 165 segmented sub-images in total, with 11664/808+1=15 rows and 8750/808+1=11 columns. VC707 provided by Xilinx Company is selected as the development board, and the target FPGA chip is XC7VX485T-2FFG1761C. A total of 11 on-chip BRAMs are needed to cache 11 columns of segmented sub-images, and the BRAMs are numbered as BRAM_0, BRAM_1, . . . , BRAM_10. Each pixel in the picture accounts for 32 bits, and the bit width of the AXI bus is 512 bits. Each on-chip BRAM is composed of eight 36 Kb BRAMs spliced in parallel, which can support a maximum burst continuous write length of 256 times according to the AXI bus protocol and provide buffer margin for a dual-port BRAM parallel pipeline reading and writing. The whole sub-image segmentation task of the overlapping sliding window only needs 88 36 Kb BRAMs.

The specific execution process of this embodiment is as follows.

In step 1, starting from the first row in the upper left corner of an original input large-size image, the data of pixels (1,1) to (1,808) are written into BRAM_0 in sequence, and pixels (1,809) to (1,1024) are overlapping areas of the $(0,0)^{th}$ and $(0,1)^{th}$ segmented sub-images in the first row of segmented sub-images in the horizontal sliding window process of the first row; the 216 pixel data are written into BRAM_1 in parallel while being written into BRAM_0, and BRAM_1 corresponds to the $(0,1)^{th}$ segmented sub-image, so that parallel processing of the overlapping data in the horizontal sliding window is realized. As shown in FIG. 1, the overlapping area of m=11664, n=8750, k=1024 and s=808 is k−s=216; in the figure, the cross stripe area in the figure represents the overlapping area generated by the sliding window process, and the rightmost and bottommost areas are filled with all-zero pixels, which are used for image rounding.

In step 2, the sliding window is slid horizontally to the right, and the data of pixels (1,1025) to (1,1616) in the first row are continuously written to BRAM_1. In this embodiment, 512 bits with a preset threshold of a maximum of 256 times for starting burst continuous writing from each on-chip BRAM to the off-chip DDR memory are subjected to burst continuous writing, therefore it is necessary to execute more than 4 rows of horizontal overlapping sliding windows before starting write operation to the off-chip DDR memory. The preset threshold here is equal to the maximum capacity of burst continuous writing, thus making the access efficiency to the external DDR the highest.

In step 3, the area of the pixels (1,1617) to (1,1832) is the overlap of the $(0,1)^{th}$ and $(0,2)^{th}$ segmented sub-images in the horizontal sliding window process of the first row. Similar to step S1, the overlapped data are synchronously written into BRAM_1 and BRAM_2, where BRAM_2 corresponds to the $(0,2)^{th}$ segmented sub-image.

Figure 2:
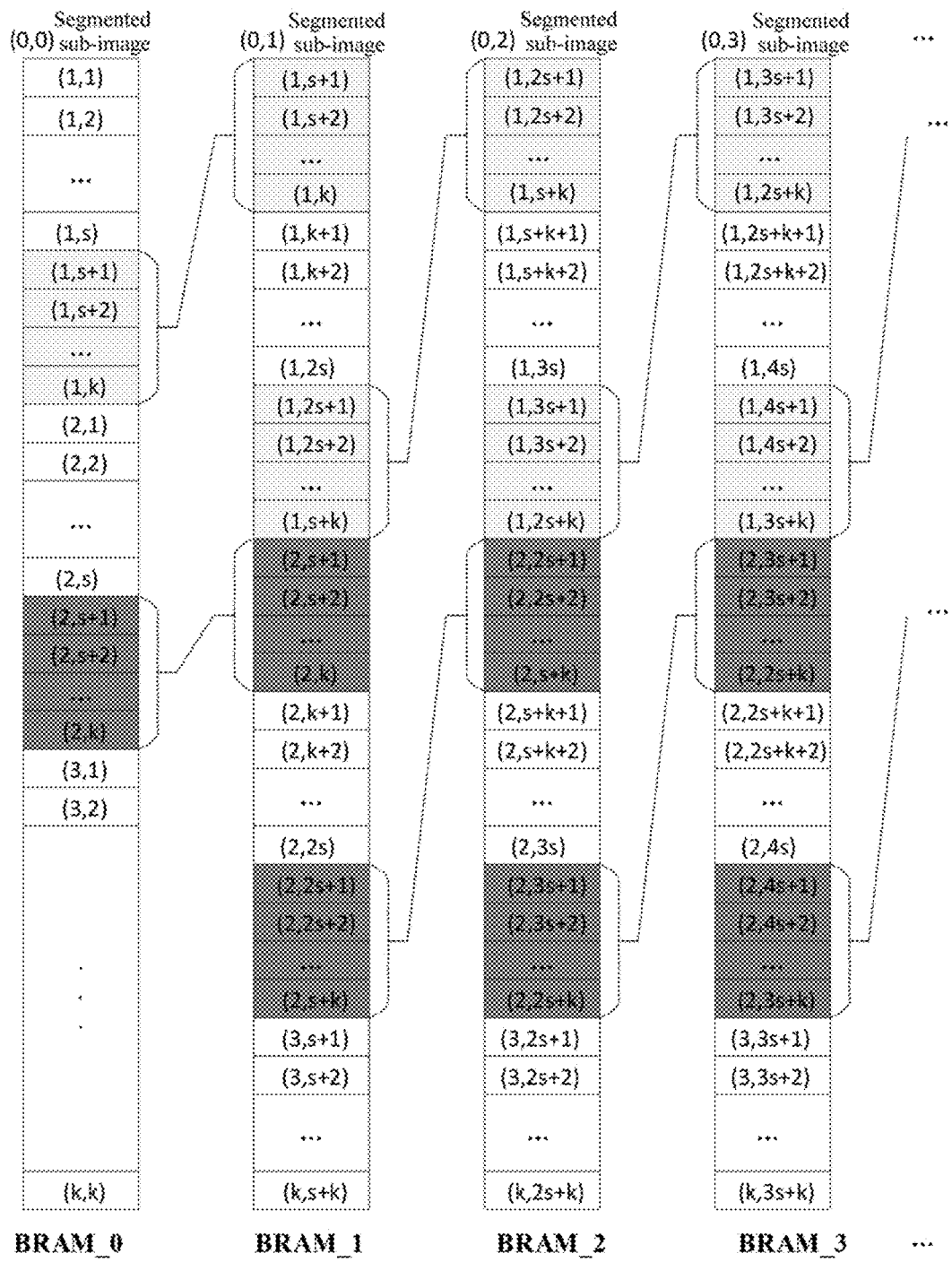
FIG. 2 is a schematic diagram of storing pixel data in an on-chip BRAM of an FPGA in segmentation of horizontally overlapping sliding windows.

In step 4, subsequent operations are executed in a similar manner, until the horizontal overlapping sliding window segmentation of all pixels in the first row is completed; the schematic diagram of storing the pixel data of each segmented sub-image in the BRAMs during the horizontal sliding window process is shown in FIG. 2, where k=1024 and s=808.

In step 5, referring to the first row, horizontal overlapping sliding windows are sequentially executed from the second row to the $1024^{th}$ row until a first complete horizontal overlapping sliding window is executed; during this process, when four consecutive horizontal sliding windows are executed, the data capacity received by each BRAM storage reaches the threshold of a maximum of 256 times of bursts of continuous writing of 512 bits, which will start reading from the on-chip BRAMs and writing to the off-chip DDR memory, and at the same time, each BRAM will provide sufficient margin to ensure parallel and pipeline writing of pixel data in the subsequent sliding window segmentation without overwriting the previous batch of segmented sub-image data.

Figure 3:
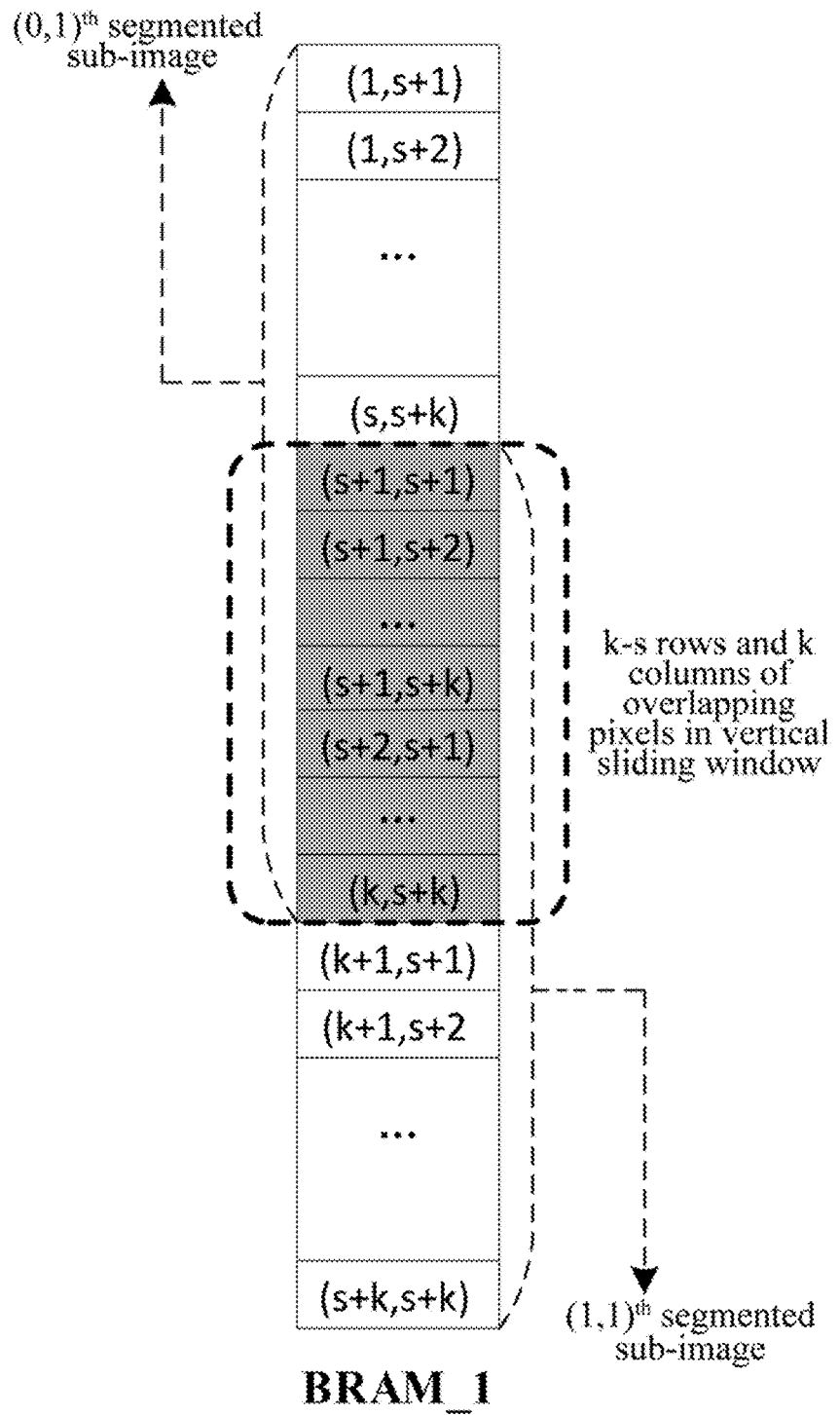
FIG. 3 is a data storage diagram of upper and lower adjacent segmented sub-images in a BRAM in segmentation of vertically overlapping sliding windows.

In step 6, vertical overlapping sliding window processing is executed, and the last 216 rows and 1024 columns of pixel data of segmented sub-images (0,0), (0,1), . . . , (0,10) are used as the starting 216 rows and 1024 columns of pixel data of the next batch of segmented sub-images (1,0), (1,1), . . . , (1,10) in the off-chip DDR memory and are spliced with each row of pixel data written subsequently. As shown in FIG. 3, the data storage relationship between the $(0,1)^{th}$ segmented sub-image and the $(1,1)^{th}$ segmented sub-image in the first column is described, where k=1024 and s=808.

Figure 4:
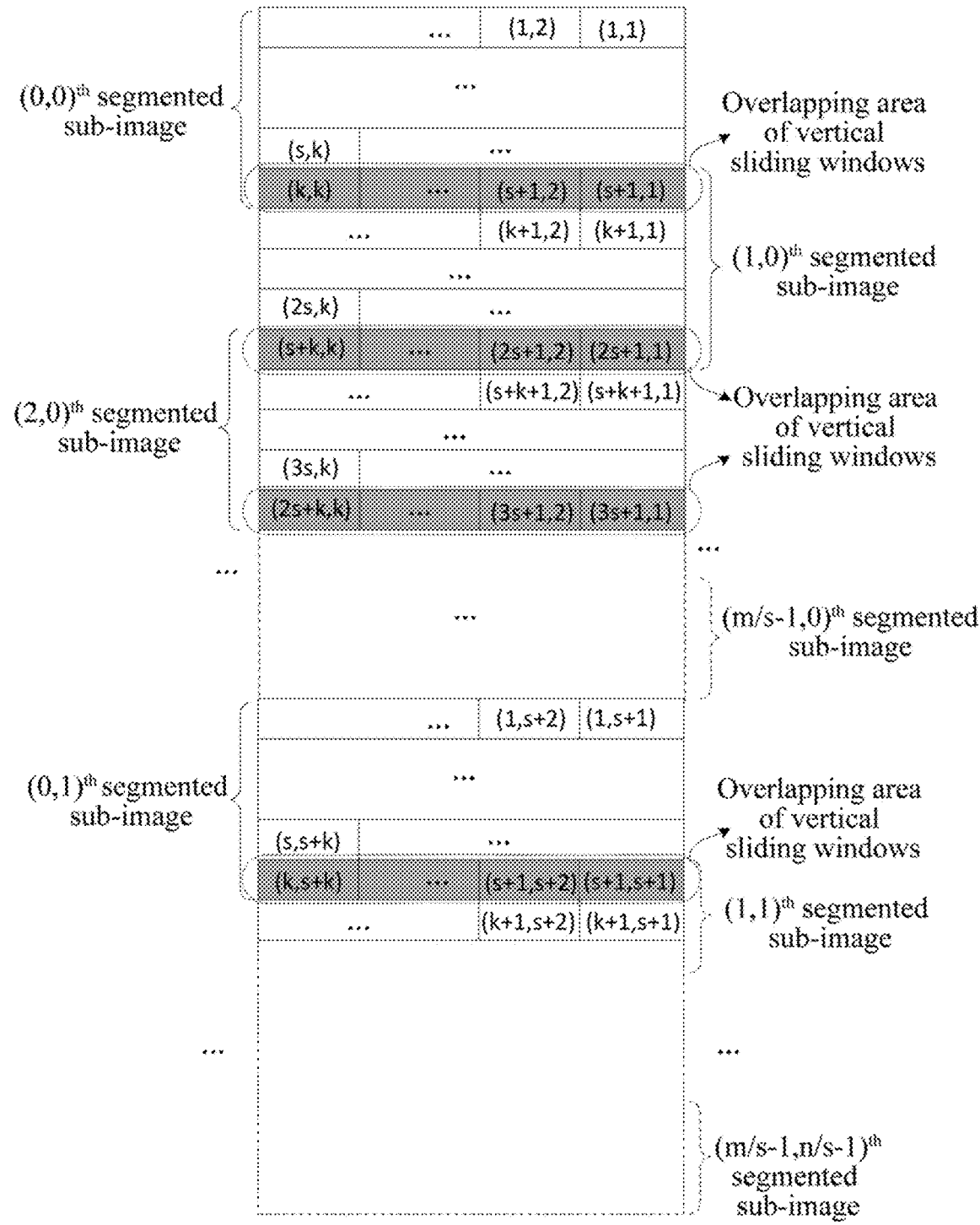
FIG. 4 is an overall addressing sequence diagram of various segmented sub-images in an external DDR memory.

In step 7, the horizontal overlapping sliding window processing from the $1025^{th}$ row to the $1832^{nd}$ row of the original image is carried out according to steps 1 to 5, so the second batch of segmented sub-images (1,0), (1,1), . . . , (1,10) are written into the lower half of the corresponding storage space in BRAM_0, BRAM_1, . . . , BRAM_10, respectively, and the burst continuous write operation of the on-chip BRAMs to the off-chip DDR memory. The overall addressing sequence of the sub-images in the external DDR memory is shown in FIG. 4, in which m=11664, n=8750, k=1024, and s=808 are stored, and 165 segmented sub-images are stored in total. The pixel data in each segmented sub-image is continuously addressed in row-major order, and the segmented sub-images are sorted in column-major order with continuous addressing, that is, the storage order of the sub-images is (0,0), (1,0), (2,0), . . . , (14,0), (0,1), (1,1), . . . , (14, 10), which is very suitable for efficient call of segmented sub-image data by subsequent deep learning algorithm modules.

In step 8, operations similar to step 1 to step 7 are repeated in the same manner, and cross processing of horizontal overlapping sliding windows and vertical overlapping sliding windows is executed until the whole original input large-size image is fully segmented and written into the external DDR memory; at this point, all the processes of overlapping sliding window segmentation of the large-size image based on an FPGA with billion-scale pixels of 11664 rows×8750 columns have been implemented.

From the embodiment of the present application, it can be found that for the overlapping sliding window segmentation of a m-row×n-column large-size image, the processing efficiency of horizontally overlapping pixel data is improved by adopting a parallel and synchronous writing mode for the repeated data generated by the horizontal sliding windows; for the repeated data generated by vertically overlapping sliding windows, the starting address of the off-chip DDR memory is subjected to rollback offset and the data are spliced with subsequent pixel data, thus realizing data reuse and saving storage space occupation; the segmented sub-images are continuously addressed in the off-chip DDR memory, which is beneficial to the efficient call of subsequent deep learning algorithms. The present application can realize high-efficiency overlapping sliding window segmentation of large-size images, which is helpful to significantly improve the overall real-time performance of target detection and recognition of large-size images.

Corresponding to the aforementioned embodiment of the method for overlapping sliding window segmentation of an image based on an FPGA, the present application further provides an embodiment of system for overlapping sliding window segmentation of an image system based on an FPGA.

Figure 5:
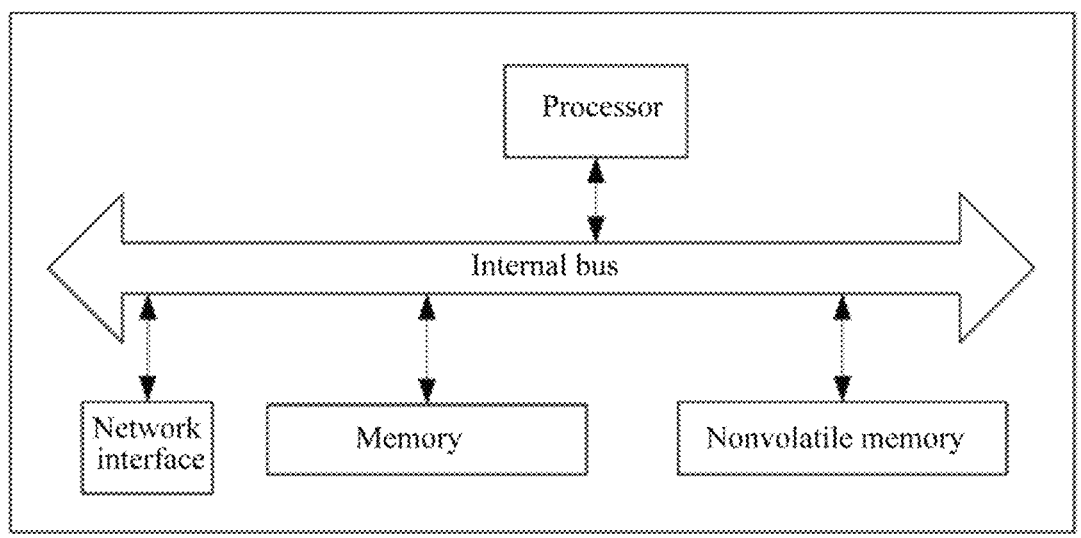
FIG. 5 is a schematic diagram of a system for overlapping sliding window segmentation of an image based on an FPGA according to the present application.

Referring to FIG. 5, an embodiment of the present application provides a system for overlapping sliding window segmentation of an image based on an FPGA, which includes one or more processors for implementing the method for overlapping sliding window segmentation of an image based on an FPGA in the above embodiment.

The embodiment of the system for overlapping sliding window segmentation of an image based on an FPGA of the present application can be applied to any device with data processing capability, which can be a device such as a computer or the like. The embodiment of the device can be realized by software, or by hardware or a combination of hardware and software. Taking software implementation as an example, as a logical system, it is formed by reading the corresponding computer program instructions from the nonvolatile memory into the memory by the processor of any device with data processing capability. From the aspect of the hardware, as shown in FIG. 5, it is a hardware structure diagram of any device with data processing capability where the system for overlapping sliding window segmentation of an image based on an FPGA of the present application is located. In addition to the processor, memory, network interface and nonvolatile memory shown in FIG. 5, any device with data processing capability where the system is located in the embodiment usually includes other hardware according to the actual functions of the device with data processing capability, which will not be described here again.

For the implementing process of the functions and roles of each unit in the above-mentioned device, please refer to the implementing process of the corresponding steps in the above-mentioned method, and will not be repeated here.

For the device embodiment, since it basically corresponds to the method embodiment, reference may be made to the description of the method embodiment for the relevant points. The device embodiment described above is only schematic, in which the units described as separate components may or may not be physically separated, and the components displayed as units may or may not be physical units, that is, they may be located in one place or distributed to multiple network units. Some or all of the modules can be selected according to actual needs to achieve the purpose of the solution of the present application. Those skilled in the art can understand and implement them without creative effort.

An embodiment of the present application also provides a computer-readable storage medium, on which a program is stored. When executed by a processor, the program implements the method for overlapping sliding window segmentation of an image based on an FPGA in the above embodiment.

The computer-readable storage medium can be an internal storage unit of any device with data processing capability as described in any of the previous embodiments, such as a hard disk or a memory. The computer-readable storage medium can also be an external storage device, such as a plug-in hard disk, a SmartMedia card, SMC), a SD card, a Flash card, etc. provided on the device. Further, the computer-readable storage medium may further include both internal storage units and external storage devices of any device with data processing capability. The computer-readable storage medium is used for storing the computing program and other programs and data required by any device with data processing capability, and may also be used for temporarily storing data that has been or will be output.

Other embodiments of the present application would be easily conceived by those skilled in the art after by considering the description and practicing the disclosure herein. This application is intended to cover any variations, uses or adaptive changes of this application, which follow the general principles of this application and include common sense or common technical means in this technical field that are not disclosed in this application. The description and examples are to be regarded as exemplary only, with the true scope and spirit of the present application being indicated by the claims.

It should be construed that this application is not limited to the precise structure described above and shown in the drawings, and various modifications and changes can be made without departing from its scope. The scope of this application shall be limited only by the claims.

The invention claimed is:

1. A method for overlapping sliding window segmentation of an original input image based on a field programmable gate array (FPGA), wherein the original input image is m rows×n columns, and a size of a segmented sub-image is k rows×k columns; a step size of an overlapping sliding window process is s, and s<k, the overlapping sliding window process comprises a horizontal overlapping sliding window process and a vertical overlapping sliding window process, and a sequence of the horizontal overlapping sliding window process is horizontal from left to right, and the vertical overlapping sliding window process is vertical from top to bottom; if a boundary is not divisible, expansion is implemented by filling all-zero pixels outwards; the FPGA needs ⌈n/s⌉ block random access memories (BRAMs) in total, which are numbered as 0,1, 2, . . . , ⌈n/s⌉−1, where ⌈ ⌉ means rounding up, where m, n and k are positive integers, 1<m, 1<n, k<m, and k<n;

the method comprises:
step S1: starting from a first row of the original input image, writing pixel data from (1,1) to (1,s) into BRAM_0 in sequence, wherein BRAM_0 corresponds to a $(0,0)^{th}$ segmented sub-image, (1,s+1) to (1,k) are overlapping areas of the $(0,0)^{th}$ segmented sub-image and a $(0,1)^{th}$ segmented sub-image in the horizontal overlapping sliding window process in the first row;

and writing data in the overlapping areas into BRAM_0 and BRAM_1 in synchronous and parallel manner, wherein BRAM_1 corresponds to the $(0,1)^{th}$ segmented sub-image;

step S2: executing the horizontal overlapping sliding window process, and writing pixel data of (1, k+1) to (1,2s) in the first row into BRAM_1; during the horizontal overlapping sliding window process, starting a burst continuous write operation of each BRAM of the BRAMs to an off-chip DDR memory when data received by each BRAM reaches a preset threshold or when a last pixel of each segmented sub-image is written into a BRAM of the BRAMs corresponding to the segmented sub-image;

step S3: (1, 2s+1) to (1,s+k) pixels being overlaps of the $(0,1)^{th}$ segmented sub-image and a $(0,2)^{th}$ segmented sub-images in the horizontal overlapping sliding window process of the first row, and writing overlapped data synchronously into BRAM_1 and BRAM_2, wherein BRAM_2 corresponds to the $(0,2)^{th}$ segmented sub-image;

step S4: executing the horizontal overlapping sliding window process in the first row, until the horizontal overlapping sliding window process and segmentation are performed on all pixels in the first row;

step S5, referring to the first row, sequentially executing the horizontal overlapping sliding window process from a second row to a $k^{th}$ row so that a first complete horizontal overlapping sliding window process is executed and data corresponding to the first complete horizontal overlapping sliding window process is written into the off-chip DDR memory;

step S6: executing the vertical overlapping sliding window process, wherein last (k−s) rows and k columns of pixel data of respective segmented sub-images (0,0), (0,1), . . . , (0, ⌈n/s⌉−1) are used as starting (k−s) rows and k columns of pixel data in a next batch of segmented sub-images (1,0), (1,1), . . . , (1, ⌈n/s⌉−1), and are spliced with each row of pixel data written subsequently;

step S7: executing the horizontal overlapping sliding window process from a k+1$^{th}$ row to a s+k$^{th}$ row of the original input image according to steps S1-S5, in such a manner that a second batch of segmented sub-images (1,0), (1,1), . . . , (1, ⌈n/s⌉−1) has been written to corresponding BRAM_0, BRAM_1, . . . , BRAM_⌈n/s⌉, respectively, and executing the burst continuous write operation from the BRAMs to the off-chip DDR memory; and step S8: repeating the horizontal overlapping sliding window process and the vertical overlapping sliding window process until an overlapping sliding window of the entire original input image is segmented and written into the off-chip DDR memory, respectively.

2. The method according to claim 1, wherein during the vertical overlapping sliding window process and segmentation in step S6, the next batch of segmented sub-images and a previous batch of segmented sub-images are respectively stored in a same corresponding BRAM of the BRAMs, and (k−s)*k pixel data in the overlapping area formed by the vertical overlapping sliding window process are spliced with subsequent pixel data in the off-chip DDR memory by starting address rollback offset, thereby realizing data reuse in a vertical overlapping area.

3. The method according to claim 1, wherein the preset threshold in step S2 is equal to a maximum capacity of burst continuous writing, in such a manner that a highest access efficiency to the off-chip DDR is achieved.

4. The method according to claim 1, wherein internal pixel data of each segmented sub-image written in the off-chip DDR memory in step S8 are continuously addressed in row-major order, and respective segmented sub-images are sorted in column-major order with continuous addresses, that is, the sub-images are stored in an order of (0,0), (1,0), (2,0), . . . , (⌈m/s⌉−1,0), (0,1), (1,1), . . . , (⌈m/s⌉−1, ⌈n/s⌉−1).

5. A system, comprising one or more processors for implementing the method according to claim 1.

6. A non-transitory computer-readable storage medium, wherein a program is stored thereon, and when executed by a processor, the program implements the method according to claim 1.

* * * * *